(12) United States Patent
De Vreede et al.

(10) Patent No.: US 10,117,540 B2
(45) Date of Patent: Nov. 6, 2018

(54) CONSUMABLE RECOGNITION SYSTEM AND BEVERAGE DISPENSER

(71) Applicant: KONINKLIJKE PHILIPS N.V., Eindhoven (NL)

(72) Inventors: Jasper De Vreede, Eindhoven (NL); Harmina Christina Zeijlstra, Eindhoven (NL); Gerben Kooijman, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 138 days.

(21) Appl. No.: 15/101,951

(22) PCT Filed: Dec. 15, 2014

(86) PCT No.: PCT/EP2014/077662
§ 371 (c)(1),
(2) Date: Jun. 6, 2016

(87) PCT Pub. No.: WO2015/091301
PCT Pub. Date: Jun. 25, 2015

(65) Prior Publication Data
US 2016/0309951 A1 Oct. 27, 2016

(30) Foreign Application Priority Data

Dec. 20, 2013 (EP) ..................... 13198993

(51) Int. Cl.
*A47J 31/00* (2006.01)
*A47J 31/44* (2006.01)
*A47J 31/36* (2006.01)

(52) U.S. Cl.
CPC ....... *A47J 31/4492* (2013.01); *A47J 31/3676* (2013.01); *A47J 31/002* (2013.01)

(58) Field of Classification Search
CPC ... A47J 31/4492; A47J 31/3676; A47J 31/002
(Continued)

(56) References Cited

U.S. PATENT DOCUMENTS

| 8,857,317 B2 * | 10/2014 | Manser | A23L 1/296 99/289 R |
| 2002/0014531 A1 * | 2/2002 | Murphy | G06K 7/14 235/462.03 |

(Continued)

FOREIGN PATENT DOCUMENTS

| CN | 202843342 U | 4/2013 |
| EP | 2481330 A1 | 8/2012 |

(Continued)

*Primary Examiner* — Reginald L Alexander

(57) ABSTRACT

A consumable recognition system for recognizing placement and/or type of a consumable containing a food substance, for the preparation of a beverage using a beverage dispenser, includes a light sensor configured to sense light reflected from a reflection element of the consumable during a relative movement between the consumable and the light sensor to obtain a sensor signal. The sensor signal depends on the position, reflectivity and/or pattern of the reflection element. A movable sensor carrier is configured to carry the light sensor which is configured to sense light reflected from the reflection element during a movement of the sensor carrier. A signal processor is configured to recognize placement and/or type of consumable based on the sensor signal.

10 Claims, 7 Drawing Sheets

(58) Field of Classification Search
USPC .................................. 99/280, 282, 283, 295
See application file for complete search history.

(56) References Cited

U.S. PATENT DOCUMENTS

| | | | | |
|---|---|---|---|---|
| 2008/0187638 A1* | 8/2008 | Hansen | ............... | A47J 31/0673 426/433 |
| 2010/0186599 A1* | 7/2010 | Yoakim | ................... | A47J 31/22 99/295 |
| 2013/0064929 A1* | 3/2013 | Jarisch | ................... | A47J 31/22 426/87 |

FOREIGN PATENT DOCUMENTS

| | | | |
|---|---|---|---|
| GB | 2499496 A | 8/2013 |
| WO | 2005053485 A1 | 6/2005 |
| WO | 2007122144 A1 | 11/2007 |
| WO | 2009098392 A1 | 8/2009 |
| WO | 2011104095 A1 | 9/2011 |
| WO | 2011141532 A1 | 11/2011 |
| WO | 2012064885 A1 | 5/2012 |
| WO | 2012104301 A1 | 8/2012 |
| WO | 2012123440 A1 | 9/2012 |
| WO | 2013046149 A1 | 4/2013 |

* cited by examiner

CONSUMABLE RECOGNITION SYSTEM AND BEVERAGE DISPENSER

This application is the U.S. National Phase application under 35 U.S.C. § 371 of International Application No. PCT/EP2014/077662, filed on Dec. 15, 2014, which claims the benefit of International Application No. 13198993.1 filed on Dec. 20, 2013. These applications are hereby incorporated by reference herein.

FIELD OF THE INVENTION

The present invention relates to a consumable recognition system for recognizing placement and/or type of consumable containing a food substance for the preparation of a beverage by use of a beverage dispenser. The present invention relates further to a beverage dispenser for preparation of a beverage and to a beverage preparation system for preparation of a beverage.

BACKGROUND OF THE INVENTION

The invention relates to the area of appliances (generally referred to as beverage dispensers herein) that prepare a beverage via extraction of food substances through the passage of an extraction fluid, such as hot or cold water, under pressure. The food substance, such as coffee or tea, is contained in consumables that are inserted in these appliances. A beverage may thus generally be coffee, tea, soup, hot or cold chocolate, milk or baby food. Such a beverage making device is e.g. disclosed in WO 2005/053485 A1. Said beverage making device comprises a brewing chamber (hereinafter also called "chamber") for enclosing one or more pads containing a substance from which the beverage is to be brewed, means for supplying water to said brewing chamber, and means for conducting the brewed beverage from the brewing chamber.

More and more types and flavors of these beverages are introduced which creates a new opportunity for innovation. When the type of beverage or ingredient is recognized the appliance can automatically optimize the brewing parameters including one or more of time, temperature, pressure, flow and cup volume to the consumable offered to the appliance. Such a system for the production of beverages is e.g. disclosed in WO 2013/046149 A1, which system comprises a beverage dispenser and a pod to be inserted in the beverage dispenser for the passage of the extraction liquid of the beverage. The pod includes a filtering body (also referred to as substance containing body) which defines a space that contains the food substance from which the beverage is obtained. The filtering body has on the outside a flange. There is a recognition element associated to the filtering body which can be recognized and/or interpreted by a recognition device of the beverage dispenser.

The consumables (also called single-serve units) currently in use are basically of two types. One type of consumable is generally called a "capsule" and is basically a unit with rigid walls containing the food substance and that has two bases through which the extraction water passes. The capsules are placed into chambers defined by two bodies, one shaped to receive most of the capsule and a closing body which tightly seals the chamber. The water is introduced into the chamber and then traverses the capsule. Thanks to the rigid shape of the capsule, the hydraulic seals of the chamber allow the water to basically traverse the capsule without recirculating the extracted substance through the chamber.

A second type of consumable of a flat shape, is generally called a "pod" (or "pad") and consists of two sections made of thin soft material, pierced, paired in order to define a cavity in which the food substance is placed. The material may be for example paper, or a cloth or a non-woven fabric with filtering properties. The two sections are generally circular and are coupled along their outer edges, defining an outer annular flange. The machines which use pods have two half-shells which are sealed to define a chamber where the pod is placed. Specifically, the annular flange of the pod is squeezed, for sealing, between the opposite surfaces of the half-shells, defined outside the chamber.

For most appliances, the brewing parameters are fixed and therefore the same for each beverage. Other appliances can have manual settings, but these have to be adjusted by the user for each type of beverage. When a consumable (in particular its type, i.e. which type of food substance is held within the consumable, e.g. whether it is coffee, decaffeinated coffee, coffee distinguished by grind fineness, roast, blend, flavor, etc.) is recognized automatically by the appliance, the settings can be adjusted automatically. This increases the user convenience. Furthermore, the brewing process is correctly adjusted for each consumable type so that the optimal beverage is created.

EP 2481330 A1 discloses a beverage preparation system comprising a capsule containing a beverage preparation ingredient and a beverage preparation machine for receiving said capsule. The machine comprises a linear barcode reader for reading a linear barcode sequence contained in a segment along a peripheral path of the capsule, while said capsule is being inserted inside said machine.

SUMMARY OF THE INVENTION

It is an object of the present invention to provide a consumable recognition system for recognizing placement and/or type of consumable in a simple, foolproof and easily implementable way. It is a further object of the present invention to provide a corresponding beverage dispenser for preparation of a beverage and a corresponding beverage preparation system for preparation of a beverage.

In a first aspect of the present invention a consumable recognition system is presented comprising:
  a light sensor for sensing light reflected from a reflection element of the consumable during a relative movement between the consumable and the light sensor to obtain a sensor signal, wherein the sensor signal depends on the position, reflectivity and/or pattern of said reflection element,
  a movable sensor carrier carrying said light sensor, wherein said light sensor is configured to sense light reflected from said reflection element during a movement of said sensor carrier, and
  a signal processor for recognizing placement and/or type of consumable based on said sensor signal.

In a further aspect of the present invention a beverage dispenser is presented comprising:
  a consumable recognition system as disclosed herein for recognizing placement and/or type of consumable,
  a chamber for receiving the consumable and for the passage of extraction liquid through the consumable,
  a liquid processing unit for the passage of extraction liquid through the consumable, and
  a controller for controlling one or more parameters of the beverage dispenser according to the recognized placement and/or type of consumable.

In yet a further aspect of the present invention a beverage preparation system is presented comprising:
- a beverage dispenser as disclosed herein, and
- a consumable from among a set of consumables as disclosed herein containing a food substance, from which the beverage is obtained by use of extraction liquid, said consumable being arranged in the chamber of the beverage dispenser.

Preferred embodiments of the invention are defined in the dependent claims. It shall be understood that the beverage dispenser and beverage preparation system have similar and/or identical preferred embodiments as the claimed consumable recognition system and as defined in the dependent claims.

The present invention is based on the idea to discern/recognize the consumable based on a relative movement between the consumable and the light sensor. Since most beverage dispensers feature a closing mechanism (e.g. a lid) to close the dispenser during the brewing process, the closing movement may be used for establishing such a relative movement, in which case the light sensor is mounted to the closing mechanism, i.e. such a closing mechanism is very suitable to be used simultaneously for the recognition of the type of consumable.

During the relative movement a light reflection from a reflection element is sensed by the sensor (e.g. a photo diode or a camera) resulting in a sensor signal, which depends on a feature of the reflection element, in particular the position, reflectivity and/or pattern of said reflection element. By varying one or more of these features for each type of consumable different sensor signals are obtained for each type, which can then be linked to the correct beverage preparation parameters.

Further, it is possible in the same way to detect if a consumable has been inserted into the chamber of the beverage dispenser or not. At least one characteristic of the sensor signal depends on a feature of the reflection element, by which the different types of consumables distinguish and which will allow distinguishing the different types by evaluating said at least one characteristic. Said characteristic of the sensor signal (e.g. a current or voltage signal) or an electrical signal derived from the sensor signal may be the sensor/electrical signal's amplitude and/or phase, potentially as a function of frequency. Hence, in an embodiment, the sensor signal's amplitude at a specific (predetermined) frequency is evaluated to distinguish different types of consumables.

In this context, distinguishing the type of consumable does not only mean to distinguish if the consumable is a capsule or a pad, but mainly means to distinguish the type of food substance contained (e.g. whether it is coffee, decaffeinated coffee, coffee distinguished by grind fineness, roast, blend, flavor, etc.) and/or the quantity of substance. Based on the recognized type, the beverage dispenser, possibly in combination with commands selected by the user, sets the correct process parameters, such as for example the temperature of the water, the quantity of water to be used, the pressure and/or the speed of the water supply, the infusion time, etc. For instance, if the type of consumable is recognized the kinds of beverages that may (preferably) be prepared may be shown on a display to the user for user selection.

It should be noted that information obtained via the reflection element of the consumable may also concern other aspects, which are not linked to the preparation of the beverage, such as for example statistics. For example, the beverage dispenser may memorize the number of different types of consumables used, or other data which may be useful for managing machine maintenance, or orders for new consumables based on actual consumption, etc.

Generally, the relative movement may be provided in many different ways by moving the light source and/or the consumable or by moving an element carrying the light source and/or an element carrying the consumable (e.g. a chamber that can be moved in and out like a drawer for loading a consumable into the chamber).

According to the present invention the system further comprises a movable sensor carrier carrying said light sensor, wherein said light sensor is configured to sense light reflected from said reflection element during a movement of said sensor carrier. Said sensor carrier is preferably part of or corresponds to a closing member of the beverage dispenser, in particular a lid of the beverage dispenser, which closing member is configured for being opened for loading a consumable into the beverage dispenser and for being closed for preparing a beverage, wherein said light sensor is configured to sense light reflected from said reflection element during the closing of said closing member. In this case no additional movable sensor carrier needs to be provided, but the already available closing member is used for this purpose.

In another embodiment said light sensor comprises a barcode scanner for scanning a barcode representing said reflection element during the relative movement between the consumable and the light sensor. Such a barcode is particularly useful for being read by a relative movement between the barcode scanner and the barcode.

Preferably, the system further comprises a light source for emitting light, in particular a light beam, in a predetermined direction to the consumable, wherein said light sensor is configured to sense light reflected from said reflection element in response to light emitted by said light source. Hence, while generally the ambient light may be sufficient for causing a reflection, this embodiment provides for a better reflection and thus for a more reliable recognition of the type of consumable.

In case a sensor carrier is provided as explained above, a position sensor is preferably provided for sensing a position of said sensor carrier, at which light reflected from said reflection element is sensed, wherein said sensor signal represents said position. For instance, the angular position of the closing member of the beverage dispenser may be measured by use of an angle detector, which particularly be used in an embodiment, in which said sensor carrier is part of or corresponds to a lid of the beverage dispenser. In this case the angular position, at which light reflected from said reflection element is sensed, wherein said sensor signal represents said angular position.

For moving the consumable or a movable consumable carrier carrying the consumable an actuator may be provided in an embodiment, while in another embodiment the movement of the consumable or of the consumable carrier may be effect by the user by hand.

As mentioned above the consumable comprises a reflection element for reflecting incident light during a relative movement between the consumable and a light sensor of a consumable recognition system. Various embodiments may be used for said reflection element. Preferably, the reflection element is a barcode, stripe, ring or spot, which is arranged at the consumable so that it undergoes a relative movement with respect to said light source when the light source and/or the consumable is moved.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1A:
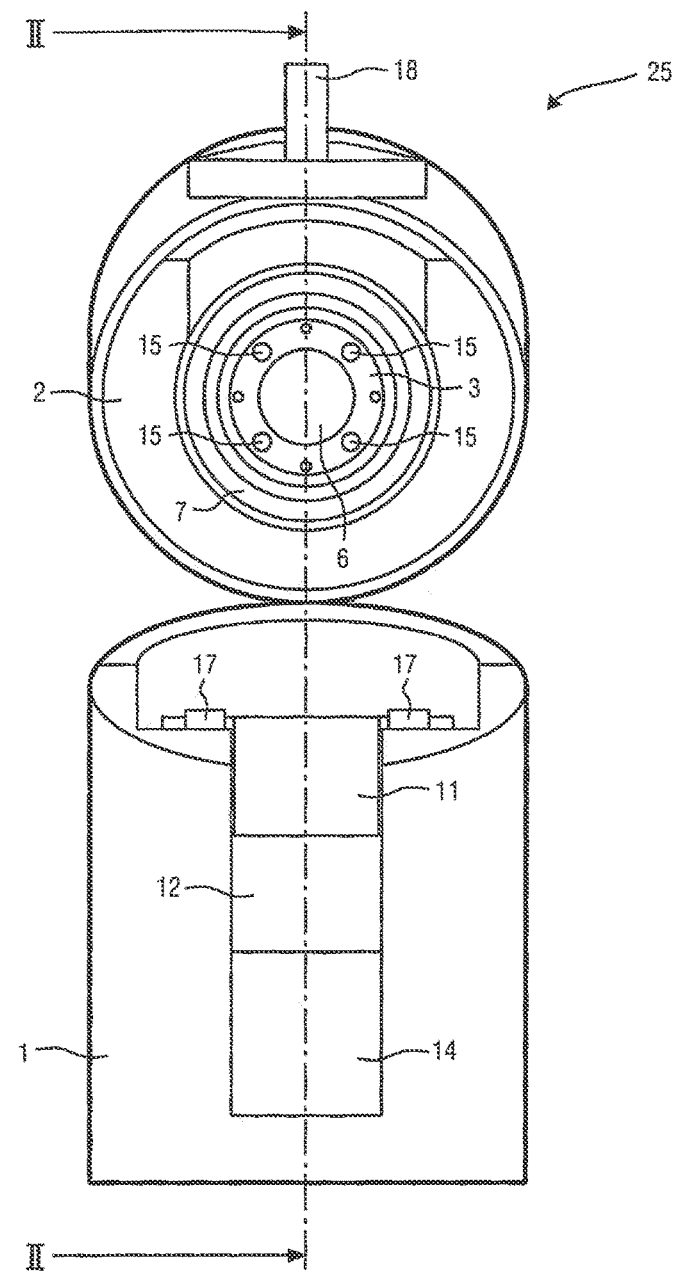
FIG. 1 shows different views of an embodiment of a beverage dispenser according to the present invention.

FIG. 1 shows different views of an embodiment of a beverage dispenser 25 in the form of a coffee making device that generally, together with the consumable 4, forms a beverage preparation system. The coffee making device (i.e. the beverage dispenser 25) includes a (schematically depicted) consumable recognition system 30 according to the present invention. The coffee making device uses soft pads as consumables, but it shall be noted here that the invention is neither limited to the use of pads nor limited to coffee making devices. In other embodiments the beverage dispenser is configured to be used for making other beverages than coffee, e.g. tea, hot or cold milk, soup, baby food, etc. Further, pods or capsules may be used as consumables, and the consumables generally contain a corresponding food substance for the preparation of the respective beverage by use of the beverage dispenser.

The coffee making device comprises a stationary part 1 and a hinging part 2. The stationary part 1 comprises the lower wall 8, 9 of the brewing chamber 19 and the hinging part 2 includes the upper wall 3 of the brewing chamber 19. The stationary part 1 furthermore comprises a water container and means for heating the water (or, more generally, an extraction liquid) and pumping a predetermined quantity of the heated water to the brewing chamber 19, which portions of the device are only schematically shown as liquid processing unit 20 for the passage of extraction liquid through the pad 4.

FIG. 1A is a front view of the uppermost portion of the coffee making device showing the stationary part 1 and the hinging part (or lid) 2 of the device. The lid 2 is represented in the open position, i.e. the position in which the brewing chamber 19 is accessible, for example for replacing the pad 4. The upper wall 3 of the brewing chamber is in a substantially vertical position in this case.

Figure 1B:
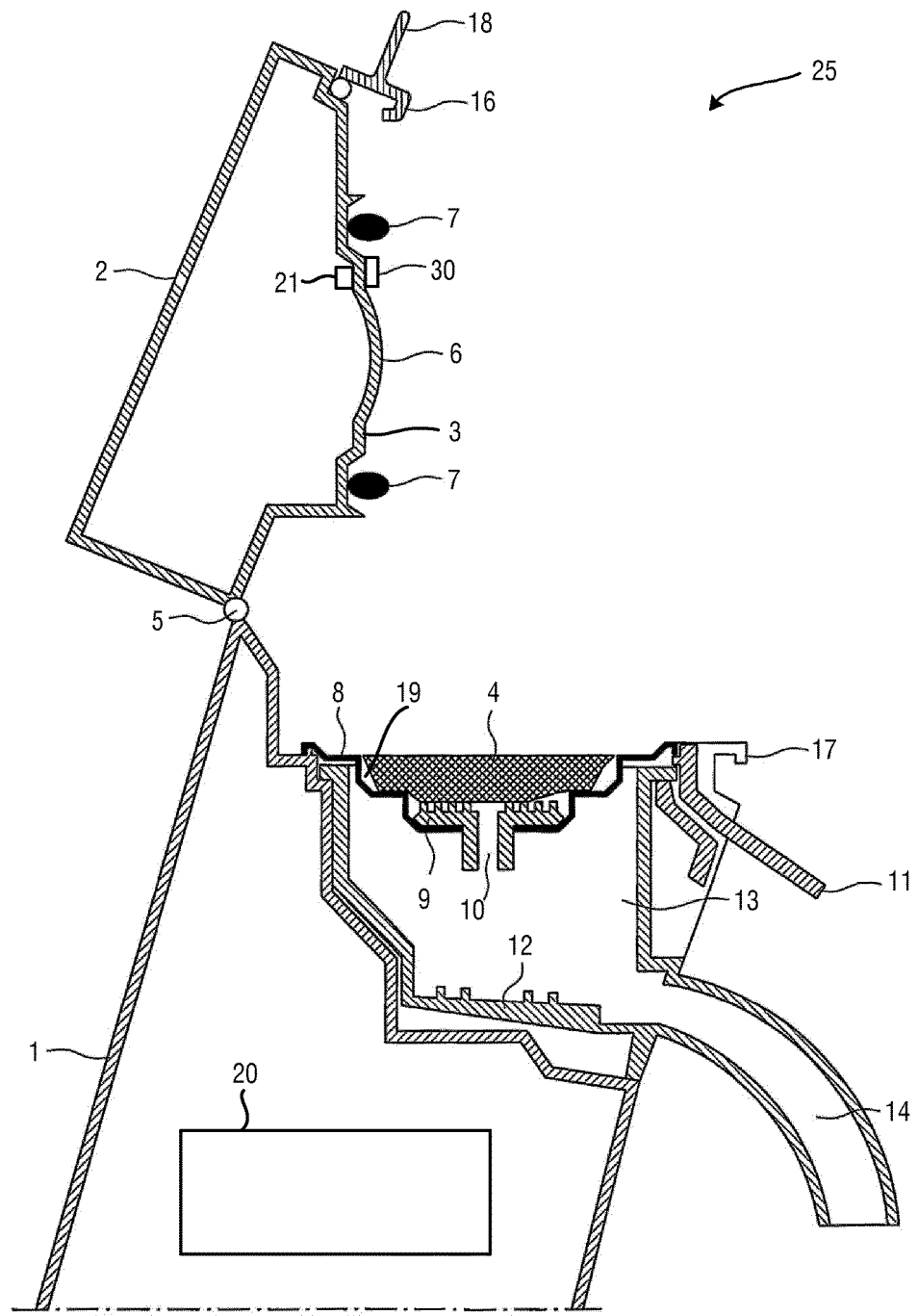
Figure 1C:
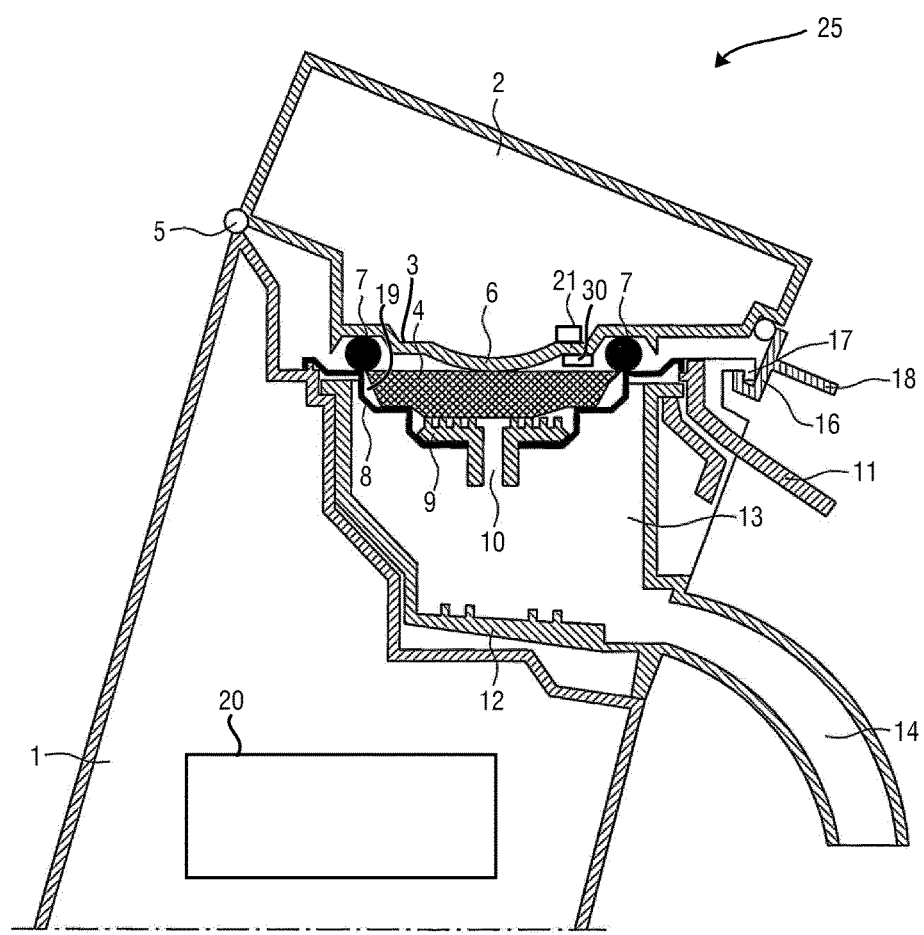

FIGS. 1B and 1C are cross-sectional views with the lid 2 shown in open position (FIG. 1B) and in closed position (FIG. 1C) respectively. The lid 2 hinges about an axis 5, so that it can make a rotating movement. The upper wall 3 of the brewing chamber is provided with a spherical protrusion 6 in its central part, i.e. a dome in the wall 3. A flexible sealing ring 7 is attached to the hinging lid 2 around the upper wall 3.

A first removable part, forming the lower wall of the brewing chamber, is composed of a metal part 8 with attached to it a plastic element 9 having a central outflow opening 10. At its upper side, the plastic element 9 is provided with a number of protrusions to support the pad 4 and to create space for conducting the brewed beverage between the protrusions. The first removable part 8, 9 is designed to contain one pad 4. It can be replaced by a different removable part being designed to contain two pads 4, in which case it encloses more space.

The first removable part 8, 9 is provided with a handle 11 to facilitate its removal from the stationary part 1 of the device. The first removable part 8, 9 can be removed for replacement or cleaning. Below said first removable part 8, 9 there is a second removable part 12, enclosing a beverage collection chamber 13 and provided with a beverage outflow tube 14 that extends outside the stationary part 1 of the device. The brewed beverage, collected in collection chamber 13, leaves the device through outflow tube 14 and can be caught in a cup or the like.

When the lid 2 is closed, sealing ring 7 abuts against the upper wall 3 as well as against said part 8 of the first removable part 8, 9, so that the brewing chamber 19 is closed, except for the holes 15 (or nozzles) in the upper wall 3 for supplying heated water to the brewing chamber, and except for the outflow opening 10. The brewing chamber 19 may enclose a pad 4 as shown in FIG. 1C. Heated water is supplied through holes 15 in the upper wall 3 and passes through the pad 4 to extract coffee. The brewed coffee leaves the brewing chamber through the outflow opening 10. Then the brewed coffee will be collected in the beverage collection chamber 13 and subsequently leave the device through outflow tube 14.

As is shown in FIG. 1C, the lid 2 is kept closed by a hinging latch 16 engaging a downwardly extending edge 17 of the stationary part 1 of the device. The latch 16 can only be released in that the lid 2 is moved in downward direction. The upper wall 3 of the brewing chamber is moved towards the lower part 8, 9 thereby, so that the dome 6 is pressed into the pad 4. This movement squeezes the pad 4, so that excess residue liquid will leave the pad 4 and will leave the brewing chamber through outflow opening 10.

The consumable recognition system 30 allows recognizing placement and/or type of consumable in a simple, foolproof and easily implementable way. Once the type of consumable (pod) 4 is recognized one or more parameters of the beverage dispenser 25 are controlled by a controller 21 according to the recognized type of consumable. For instance, just to give a simple example, if it is recognized that the consumable contains fine grinded coffee (which is preferably used for making espresso), the liquid is pressed with a higher pressure through the pod than in case the consumable contains regular grinded coffee (as preferably used for making coffee). Parameters that can generally be controlled may be one or more of the temperature of the water, the quantity of water to be used, the pressure and/or the speed of the water supply, the infusion time, flow and cup volume, etc. The consumable recognition system is further suitable to recognize placement of a consumable into the brewing chamber, i.e. it can be recognized if or if not a consumable has been inserted, based on which information the dispensing process may be started automatically (if a consumable has been inserted) or a signal may be issued indicating that a consumable needs to be inserted.

The general idea of using a consumable recognition system and a control of one or more parameters of the beverage dispenser based on the recognized type of the consumable can also be used in other types of beverage dispensers using e.g. capsules as consumables. Such beverage dispensers are widely known and used. An example of such a beverage dispenser is e.g. described in WO 2012/123440 A1, which also includes a sensing arrangement for detecting an event related to the insertion of a capsule and/or the presence of a capsule as well as the type of capsule in order to automate the preparation of the beverage.

Hence, even if the various embodiments of consumables and consumable recognition systems explained in the following refer to a particular type of consumable and, thus, a particular type of beverage dispenser, the respective embodiments shall generally not be understood to be limited only to this type of consumable and/or this type of beverage dispenser.

Figure 2:
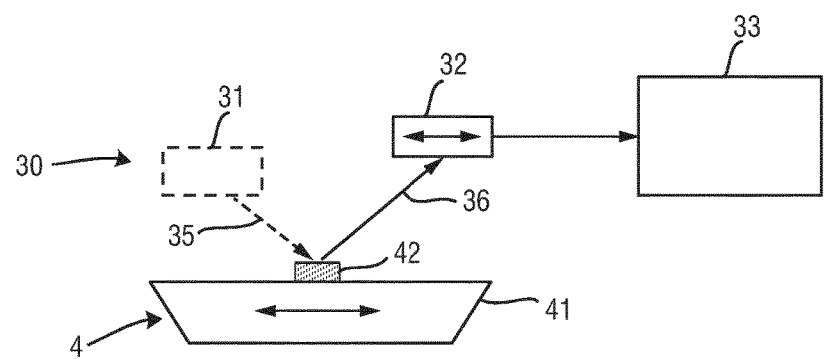
FIG. 2 shows a schematic diagram of two general layouts of a consumable recognition system according to the present invention and a corresponding consumable.

An embodiment of a consumable recognition system according to the present invention and a corresponding consumable are depicted in FIG. 2. The consumable recognition system 30 generally comprises a light sensor 32 for sensing light 36 reflected from a reflection element 42 of the consumable 4 during a relative movement (indicated by the double arrows) between the consumable 4 and the light sensor 32 to obtain a sensor signal, wherein the sensor signal depends on the position, reflectivity and/or pattern of said reflection element 42. The consumable recognition system 30 further comprises a signal processor 33 for recognizing placement and/or type of consumable 4 based on said sensor signal. Optionally, a light source, e.g. an LED or a laser, is provided for emitting light 35, in particular a light beam, in a predetermined direction to the consumable 4, wherein said light sensor 32 is configured to sense light 36 reflected from said reflection element 42 in response to light emitted by said light source 31.

The consumable 4 generally comprises a filtering body 41 defining a space containing a food substance, from which the beverage is obtained, and a reflection element 42 for reflecting incident light during a relative movement between the consumable 4 and the light sensor 32 of the consumable recognition system 30, wherein said reflection element 42 has a different position, reflectivity and/or pattern for each type of consumable of the set of consumables.

Next, several detailed embodiments of a consumable and corresponding detailed embodiments of the consumable recognition system according to the present invention will be explained. For the consumable it will be explained how the different types of consumables of a set of consumables containing those different types can be distinguished and how the consumable recognition system is accordingly constructed. For the respective consumable recognition systems the signal processor is generally not explicitly shown.

Figure 3A:
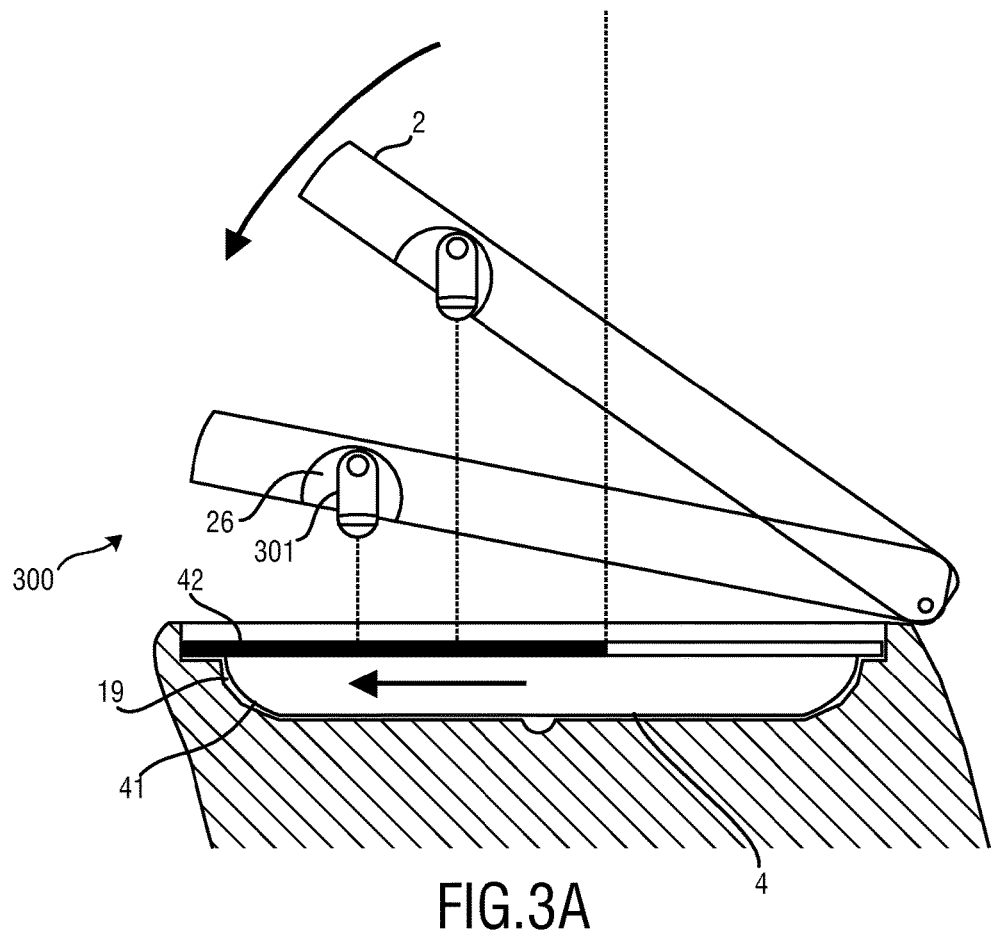
FIG. 3 shows a side view of a first embodiment of a consumable recognition system according to the present invention and top views of two embodiments of a corresponding consumable.
Figure 3B:
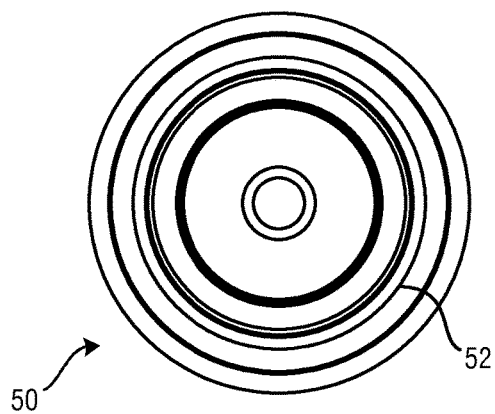
Figure 3C:
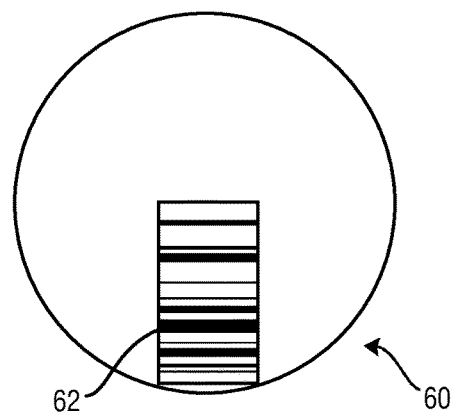

FIG. 3 shows a side view (FIG. 3A) of a first embodiment of a consumable recognition system 300 according to the present invention and top views (FIGS. 3B, 3C) of two embodiments of a corresponding consumable 50, 60. In FIG. 3A the consumable 4 (which may be configured as shown in FIG. 3B or 3C) is shown in the chamber of the beverage dispenser. The lid 2 of the beverage dispenser, which is shown in FIG. 3A in different positions during the closing movement, comprises a barcode scanner 301 (representing the light source and the light sensor), which is mounted in this exemplary implementation in a recess 26 on the inner side of the lid 2. The barcode scanner 301 shines light onto the consumable 4 during the closing movement of the lid 2. Due to this movement with respect to the stationary consumable 4, the scanner 301 swipes over the reflection element 42. As shown in FIGS. 3B and 3C, the reflection element 42 is preferably a circular (ring-shaped) barcode 52 or a linear barcode 62, which is read during the closing movement of the lid 2.

Figure 4A:
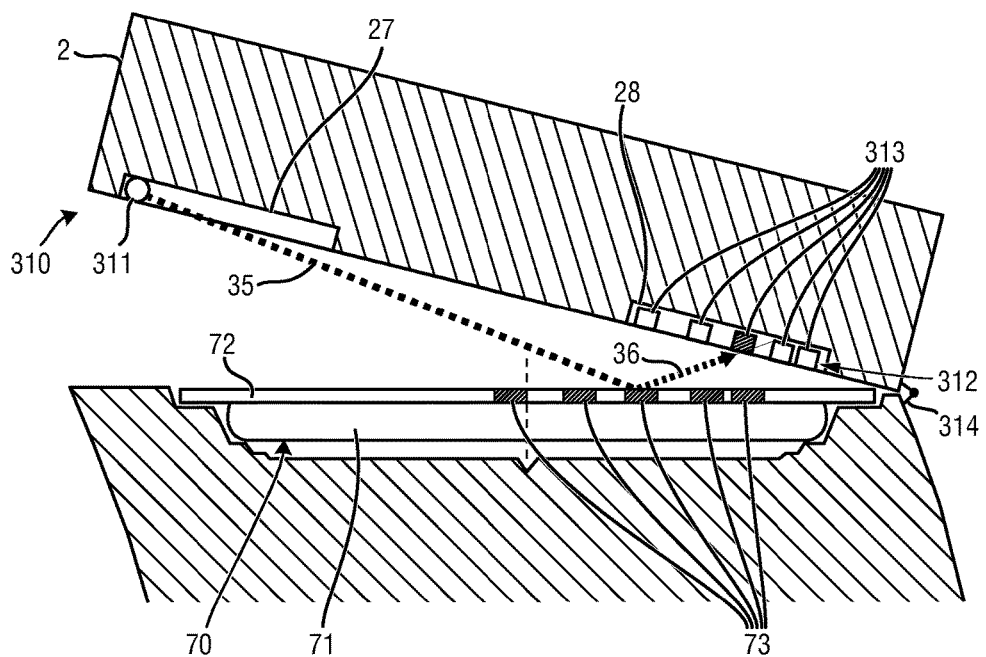
FIG. 4 shows a side view of a second embodiment of a consumable recognition system according to the present invention and a top view of an embodiment of a corresponding consumable.
Figure 4B:
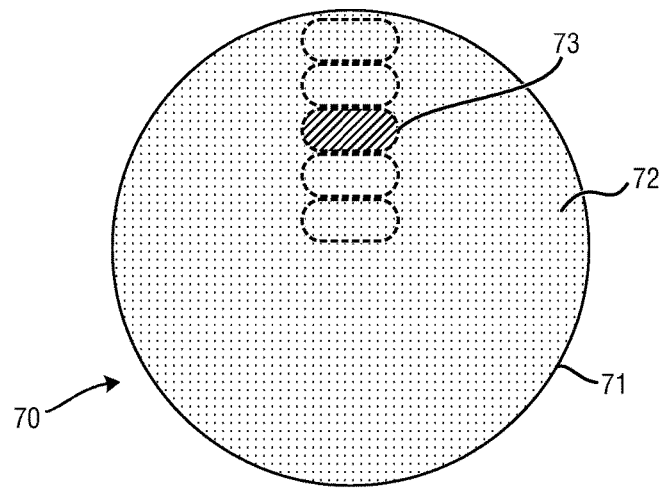

FIG. 4 shows a side view (FIG. 4A) of a second embodiment of a consumable recognition system 310 according to the present invention and a top view (FIG. 4B) of an embodiment of a corresponding consumable 70. The light source 311, e.g. an LED, and the light sensor 312, e.g. an array of sensor elements 313 (e.g. photo diodes) are arranged at the inner side of the closing mechanism 2, e.g. the lid, of the beverage dispenser, for instance in corresponding recesses 27, 28. The top surface 72 of the filtering body 71 of the consumable 70 comprises one reflective spot 73 on a specific location. Collimated light 35 emitted by the light source 311 shines onto the top 72 of the consumable 70 under a set angle during the closing of the lid 2. The light 35 is only reflected by the consumable 70 when it hits the reflective spot 73 during the closing movement. This creates a defined path for the reflected light 36, which is thus only caught by a particular sensor element 313 of the sensor array 312 (or causes a particular reflection pattern at the sensor array 312). The sensor element 313 that is triggered can then be matched with the placed type of consumable. Since the position of the reflective spot 73 is different for each type of consumable, the different types of consumables can be distinguished.

In a variation of the fourth embodiment an angle detector 314 (or tilt detector) is provided as shown in FIG. 4A for sensing the closing angle of the lid 2 at the moment when a reflection signal is received at a sensor element 313. This information will then be used together with the information about which sensor element 313 sensed a reflection to identify the particular type of consumable.

In another embodiment the number of light detectors that will 'see' light during the action of closing the lid depends on the arrangement of the reflection elements on the consumable. This provides for the type recognition without angle information (i.e. it depends on if light is detected instead of when light is detected).

It shall be noted that in the embodiments shown in FIG. 4 the reflected element 73 needs not to be configured as spots, but may also be configured differently, e.g. as stripes, rings or ring section. A ring has e.g. the advantage that it enables rotationally invariant positioning of the consumable within the chamber.

Still further, in further variations the reflective elements in the above explained embodiments may be configured such that the reflection provides a certain reflection pattern, e.g. a speckle pattern, which is different from type to type, can be sensed by the light sensor and can then be used to distinguish the different types of consumables. In particular, several reflection spots on different locations are provided which together form a pattern/code.

Figure 5A:
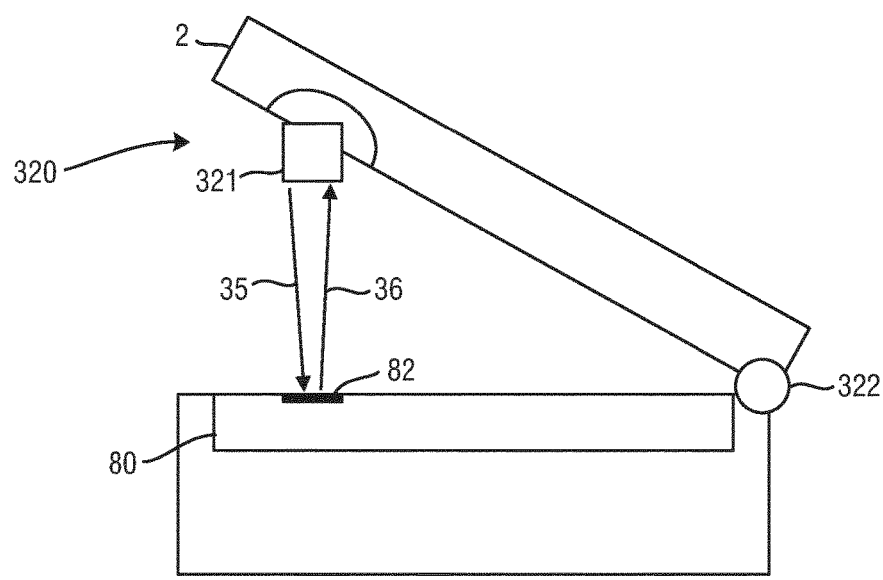
FIG. 5 shows a side view of a third embodiment of a consumable recognition system according to the present invention and top views of two embodiments of a corresponding consumable.
Figure 5B:
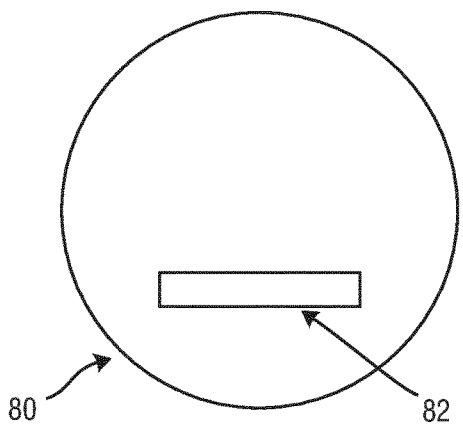
Figure 5C:
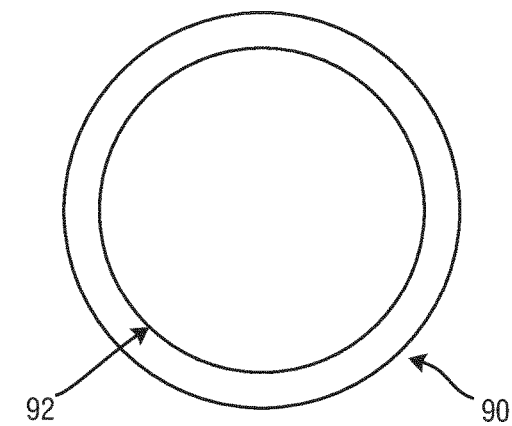

FIG. 5 shows a side view (FIG. 5A) of a third embodiment of a consumable recognition system 320 according to the present invention and top views (FIGS. 5B, 5C) of two embodiments of a corresponding consumable 80, 90. The consumable recognition system 320 comprises a transceiver 321 integrating the light source and the light sensor, which is mounted on the inner surface of the lid 2, similar to the embodiment shown in FIG. 3A. Further, a position sensor 322 for detecting the position/angle of the lid 2 is provided.

In this case the consumable recognition may be done by detecting at which lid angle a sensor signal is detected by the transceiver after reflection on the reflection element 82 provided at a particular position of the consumable 80. The sensor signal can for instance be a light beam or an ultrasound beam. The reflection element may be linear stripe 82 as shown in FIG. 5B or a circular ring 92 as shown in FIG. 5C. Each consumable type basically has its own specific position for the reflection element so that it can be recognized based on the detected sensor signal.

Figure 6:
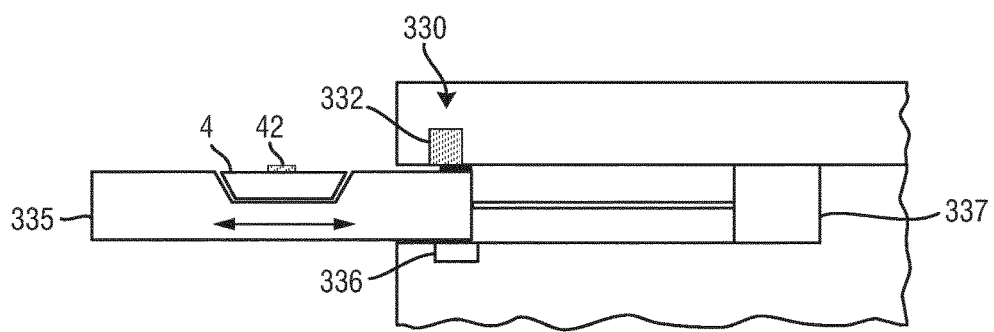
FIG. 6 shows a side view of a fourth embodiment of a consumable recognition system.

FIG. 6 shows a side view of a fourth embodiment of a consumable recognition system 330. In this case the relative movement is not provided by a movement of the light sensor 332, but by the consumable 4, which may generally be configured like any of the consumables 50, 60, 70, 80, 90 and comprise a reflection element at a particular position, which is different for each type of consumable. In particular, a movable consumable carrier 335 carrying said consumable 4 is provided, e.g. configured like a drawer. Said consumable carrier 335 is particularly configured for being moved into a loading position for loading a consumable 4 into the consumable carrier 335 and for being moved into a preparation position for preparing a beverage. The light sensor 332 is configured to sense light reflected from the reflection element 42 during the movement of the consumable carrier 335 from the loading position into the preparation position. The position at which light reflection is sensed is preferably measured by a position sensor 336.

Generally, the movement of the lid 2 (in the embodiments shown in FIGS. 3 to 5) and the consumable carrier 335, respectively, may be made by hand by the user. In another embodiment an actuator 337 may be provided as optionally shown in FIG. 6 for automatically moving the consumable carrier 335.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A consumable recognition system for recognizing placement and/or type of a consumable containing a food substance for the preparation of a beverage by use of a beverage dispenser, the consumable system comprising:
a light sensor for sensing light reflected from a reflection element of the consumable during a relative movement between the consumable and the light sensor to obtain a sensor signal, wherein the sensor signal depends on position, reflectivity and/or pattern of said reflection element;
a movable sensor carrier carrying said light sensor;
wherein said light sensor is configured to sense the light reflected from said reflection element during a linear movement of said movable sensor carrier; and
a signal processor for recognizing the placement and/or the type of the consumable based on said sensor signal.

2. The consumable recognition system as claimed in claim 1,
wherein said movable sensor carrier is part of a closing member of the beverage dispenser, wherein the member is configured to being opened for loading the consumable into the beverage dispenser and to being closed for preparing the beverage,
wherein said light sensor is configured to sense the light reflected from said reflection element during the closing of said closing member.

3. The consumable recognition system as claimed in claim 1,
wherein said light sensor comprises a barcode scanner for scanning a barcode representing said reflection element during the relative movement between the consumable and the light sensor.

4. The consumable recognition system as claimed in claim 1,
further comprising a light source for emitting light in a predetermined direction towards the consumable,
wherein said light sensor is configured to sense the light reflected from said reflection element in response to the light emitted by said light source.

5. The consumable recognition system as claimed in claim 1,
further comprising an actuator for moving the consumable or a movable consumable carrier carrying the consumable.

6. A consumable recognition system for recognizing placement and/or type of a consumable containing a food substance for the preparation of a beverage by use of a beverage dispenser, the consumable system comprising:
a light sensor for sensing light reflected from a reflection element of the consumable during a relative movement between the consumable and the light sensor to obtain a sensor signal, wherein the sensor signal depends on position, reflectivity and/or pattern of said reflection element;
a movable sensor carrier carrying said light sensor, wherein said light sensor is configured to sense the light reflected from said reflection element during a movement of said movable sensor carrier;
a signal processor for recognizing the placement and/the or type of the consumable based on said sensor signal; and
a position sensor for sensing a position of said movable sensor carrier, at which light reflected from said reflection element is sensed, wherein said sensor signal represents said position.

7. A consumable recognition system for recognizing placement and/or type of a consumable containing a food substance for the preparation of a beverage by use of a beverage dispenser, the consumable system comprising:
a light sensor for sensing light reflected from a reflection element of the consumable during a relative movement between the consumable and the light sensor to obtain a sensor signal, wherein the sensor signal depends on position, reflectivity and/or pattern of said reflection element;
a movable sensor carrier carrying said light sensor, wherein said movable sensor carrier is part of a lid of the beverage dispenser, and wherein said light sensor is configured to sense the light reflected from said reflection element during a linear movement of said movable sensor carrier;

a signal processor for recognizing the placement and/or the type of the consumable based on said sensor signal; and an angle sensor for sensing an angular position of said lid based on the light reflected from said reflection element sensed by the light sensor, wherein said sensor signal represents said angular position.

8. A beverage dispenser for preparation of a beverage by use of a consumable containing a food substance, from which the beverage is obtained by use of extraction liquid, the beverage dispenser comprising:

a consumable recognition system as for recognizing placement and/or type of the consumable, a chamber for receiving the consumable and for passage of extraction liquid through the consumable, a liquid processing unit for the passage of the extraction liquid through the consumable, and a controller for controlling one or more parameters of the beverage dispenser according to the recognized placement and/or type of the consumable, wherein the consumable system comprises a light sensor for sensing light reflected from a reflection element of the consumable during a relative movement between the consumable and the light sensor to obtain a sensor signal, wherein the sensor signal depends on position, reflectivity and/or pattern of said reflection element;

a movable sensor carrier carrying said light sensor, wherein said light sensor is configured to sense the light reflected from said reflection element during a linear movement of said movable sensor carrier;

a signal processor for recognizing the placement and/or the type of the consumable based on said sensor signal.

9. A beverage preparation system for preparation of a beverage, the beverage preparation system comprising:

a beverage dispenser including:

a consumable recognition system as for recognizing placement and/or type of a consumable from among a set of consumables, a chamber for receiving the consumable and for passage of extraction liquid through the consumable, a liquid processing unit for the passage of the extraction liquid through the consumable, and a controller for controlling one or more parameters of the beverage dispenser according to the recognized placement and/or type of consumable, wherein the consumable system comprises a light sensor for sensing light reflected from a reflection element of the consumable during a relative movement between the consumable and the light sensor to obtain a sensor signal, wherein the sensor signal depends on position, reflectivity and/or pattern of said reflection element;

a movable sensor carrier carrying said light sensor, wherein said light sensor is configured to sense the light reflected from said reflection element during a linear movement of said movable sensor carrier;

a signal processor for recognizing the placement and/or the type of the consumable based on said sensor signal, wherein the set of consumables comprises at least two consumables, each consumable of said set comprising a filtering body defining a space containing a food substance, from which the beverage is obtained and a reflection element for reflecting incident light during a relative movement between the consumable and a light sensor of a consumable recognition system, wherein said reflection element has a different position, reflectivity and/or pattern for each type of consumable of the set of consumables, said consumable being arranged in the chamber of the beverage dispenser.

10. The beverage preparation system as claimed in claim 9, wherein the reflection element is a barcode, stripe, ring or spot, which is arranged at the consumable so that reflection element undergoes a relative movement with respect to said light source when the light source and/or the consumable is moved.

\* \* \* \* \*